(12) United States Patent
Harby et al.

(10) Patent No.: US 9,664,251 B2
(45) Date of Patent: May 30, 2017

(54) COUPLER FOR TRANSLATING ROTATIONAL FORCES

(71) Applicant: DEERE & COMPANY, Moline, IL (US)

(72) Inventors: Donald Harby, Janesville, IA (US); Phillip C. Stout, Denver, IA (US); Ajit Ranjan Behera, Angul (IN)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/593,006

(22) Filed: Jan. 9, 2015

(65) Prior Publication Data

US 2016/0201758 A1 Jul. 14, 2016

(51) Int. Cl.
  *F16F 15/10* (2006.01)
  *F16F 15/16* (2006.01)
  (Continued)

(52) U.S. Cl.
  CPC .......... *F16F 15/161* (2013.01); *F01L 1/026* (2013.01); *F02M 39/00* (2013.01); *F16D 3/80* (2013.01);
  (Continued)

(58) Field of Classification Search
  CPC .. F16F 15/161; F16F 15/12353; F16F 15/121; F16D 3/80; F02M 39/00;
  (Continued)

(56) References Cited

U.S. PATENT DOCUMENTS 1,734,043 A * 11/1929 Nelson ............... F16D 3/80
  464/27
4,873,887 A * 10/1989 Andra ............... F16F 15/161
  464/68.3 X (Continued)

FOREIGN PATENT DOCUMENTS

CN   102072309 A   5/2011
CZ   19909914 A1   9/2000
(Continued)

OTHER PUBLICATIONS

Esmaeli, M.; Subramaniam, A.; Engine Timing Geartrain Concepts and Proposals for Gear Rattle Noise Reduction in Commercial Vehicles. Department of Product and Production Development, Division of Product Development, Chalmers University of Technology, pp. 1-122, Goteborg, Sweden, 2011.
(Continued)

*Primary Examiner* — Gregory Binda

(57) ABSTRACT

A coupler for translating a rotational force, including first and second rotational elements. The first rotational element defines a first pocket. The second rotational element is in axial alignment therewith and defines a second pocket facing the first pocket. The first pocket and the second pocket define a dampening chamber therebetween that varies in volume based on the overlap thereof. A fluid is positioned in the dampening chamber. A portion of the fluid is dispelled from the dampening chamber when the first rotational element rotates relative to the second rotational element and decreases the volume of the dampening chamber.

14 Claims, 7 Drawing Sheets

(51) Int. Cl.
*F16D 3/80* (2006.01)
*F16F 15/123* (2006.01)
*F01L 1/02* (2006.01)
*F16F 15/121* (2006.01)
*F16H 45/02* (2006.01)
*F02M 39/00* (2006.01)
*F02B 75/06* (2006.01)
*F01L 1/047* (2006.01)

(52) U.S. Cl.
CPC ...... *F16F 15/121* (2013.01); *F16F 15/12353* (2013.01); *F16H 45/02* (2013.01); *F01L 2001/054* (2013.01); *F01L 2810/03* (2013.01); *F02B 75/06* (2013.01); *F02M 2200/306* (2013.01)

(58) Field of Classification Search
CPC .............. F02M 2200/306; F01K 1/026; F01K 2810/03; F01K 2001/054; F16H 45/02; F02B 75/06
USPC .......................... 464/27, 66.1, 68.3; 192/208
See application file for complete search history.

(56) References Cited

U.S. PATENT DOCUMENTS

| | | | |
|---|---|---|---|
| 5,209,139 A * | 5/1993 | Janiszewski | F16F 15/13178 192/208 |
| 6,021,686 A | 2/2000 | Mizoguchi | |
| 2012/0205213 A1* | 8/2012 | Sudau | F16F 15/12353 |

FOREIGN PATENT DOCUMENTS

| | | |
|---|---|---|
| CZ | 4345346 C2 | 4/2001 |
| DE | 102012211526 A1 | 1/2014 |
| EP | 2410208 A2 | 1/2012 |
| GB | 2170882 A | 8/1986 |
| KR | 1020050033711 A | 4/2005 |

OTHER PUBLICATIONS

Suvo. How Does an Anti Backlash Gear Works? [online] Feb. 27, 2010. http://www.brighthubengineering.com/machine-design/65169-how-does-an-anti-backlash-gear-works/#imgn_1 [Retrieved Nov. 17, 2014].

European Search Report issued in counterpart application No. 15199113.0, dated Jun. 13, 2016. (7 pages ).

* cited by examiner

US 9,664,251 B2

COUPLER FOR TRANSLATING ROTATIONAL FORCES

FIELD OF THE DISCLOSURE

The present disclosure relates to a coupler for rotating translating rotational forces.

BACKGROUND OF THE DISCLOSURE

Manufacturers of nonroad diesel engines are expected to meet set emissions regulations. For example, Tier 3 emissions regulations required an approximate 65 percent reduction in particulate matter ("PM") and a 60 percent reduction in nitrogen oxides ("$NO_x$") from 1996 levels. As a further example, Interim Tier 4 regulations required a 90 percent reduction in PM along with a 50 percent drop in $NO_x$. Still further, Final Tier 4 regulations, which will be fully implemented by 2015, will take PM and $NO_x$ emissions to near-zero levels. Manufacturers of maritime engines are also expected to meet emissions regulations though they vary from the nonroad emissions regulations (e.g., International Maritime Organization regulations).

One approach for potentially aiding in meeting emissions regulations is to increase the fuel rail pressure in the engine. Some pumps that operate at these increased pressures impose high cyclic torque loads on surrounding engine gear train components. High cyclic torque may cause an increase in gear noise and failures.

SUMMARY OF THE DISCLOSURE

Disclosed is a coupler for translating a rotational force, which includes a first rotational element and a second rotational element. The first element defines a first pocket. The second rotational element is in axial alignment therewith and defines a second pocket facing the first pocket. The first and second pockets define a dampening chamber therebetween that varies in volume based on an overlap thereof. A fluid is positioned in the dampening chamber, a portion of which is dispelled therefrom when the first rotational element rotates relative to the second rotational element and decreases the volume of the dampening chamber.

BRIEF DESCRIPTION OF THE DRAWINGS

The detailed description of the drawings refers to the accompanying figures in which.

Like reference numerals in the various drawings indicate like elements.

DETAILED DESCRIPTION OF THE DRAWINGS

Figure 1:
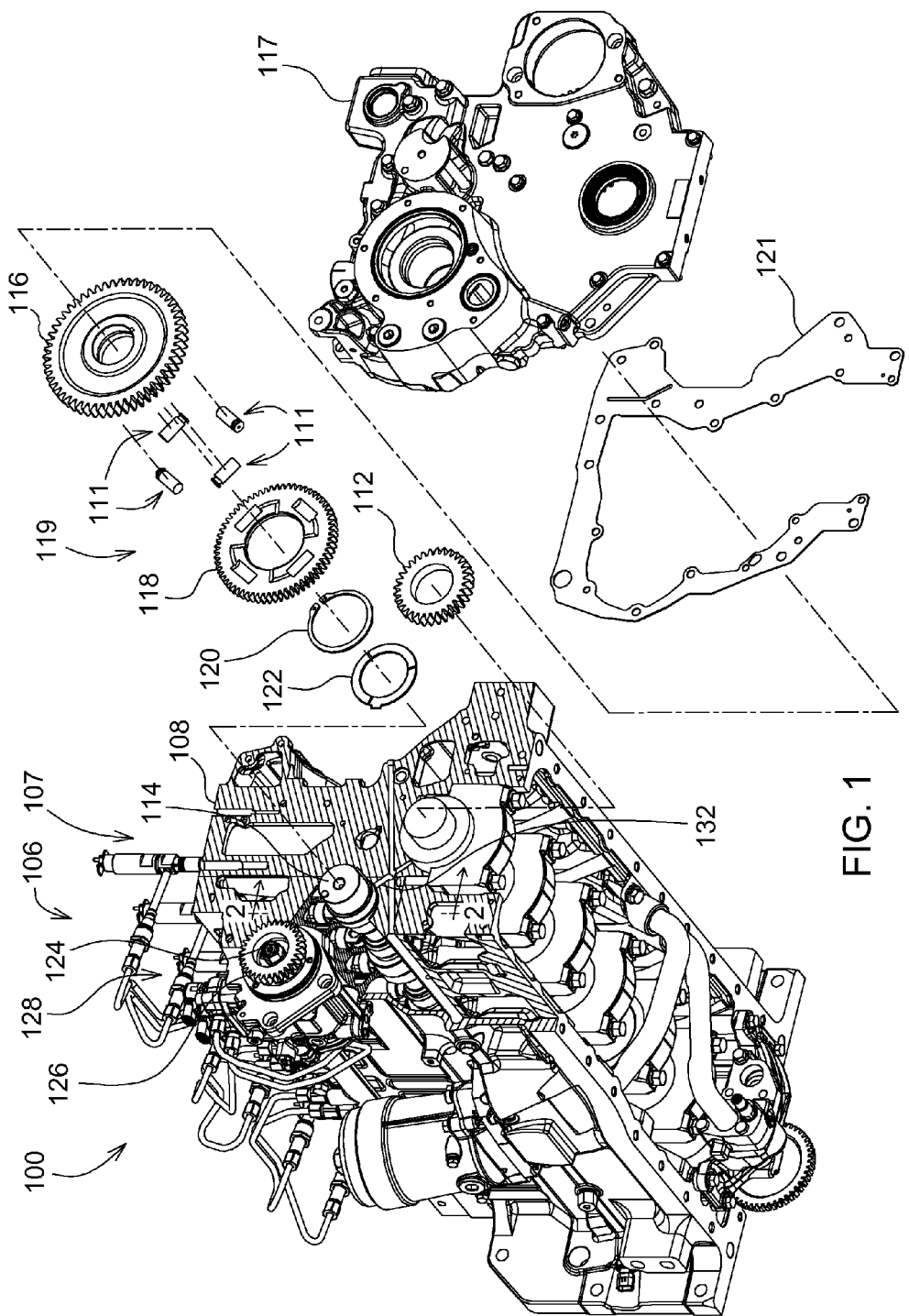
FIG. 1. is a perspective view of an embodiment of a power system including a gear train, wherein the gear train includes a coupler.
Figures 2, 2A:
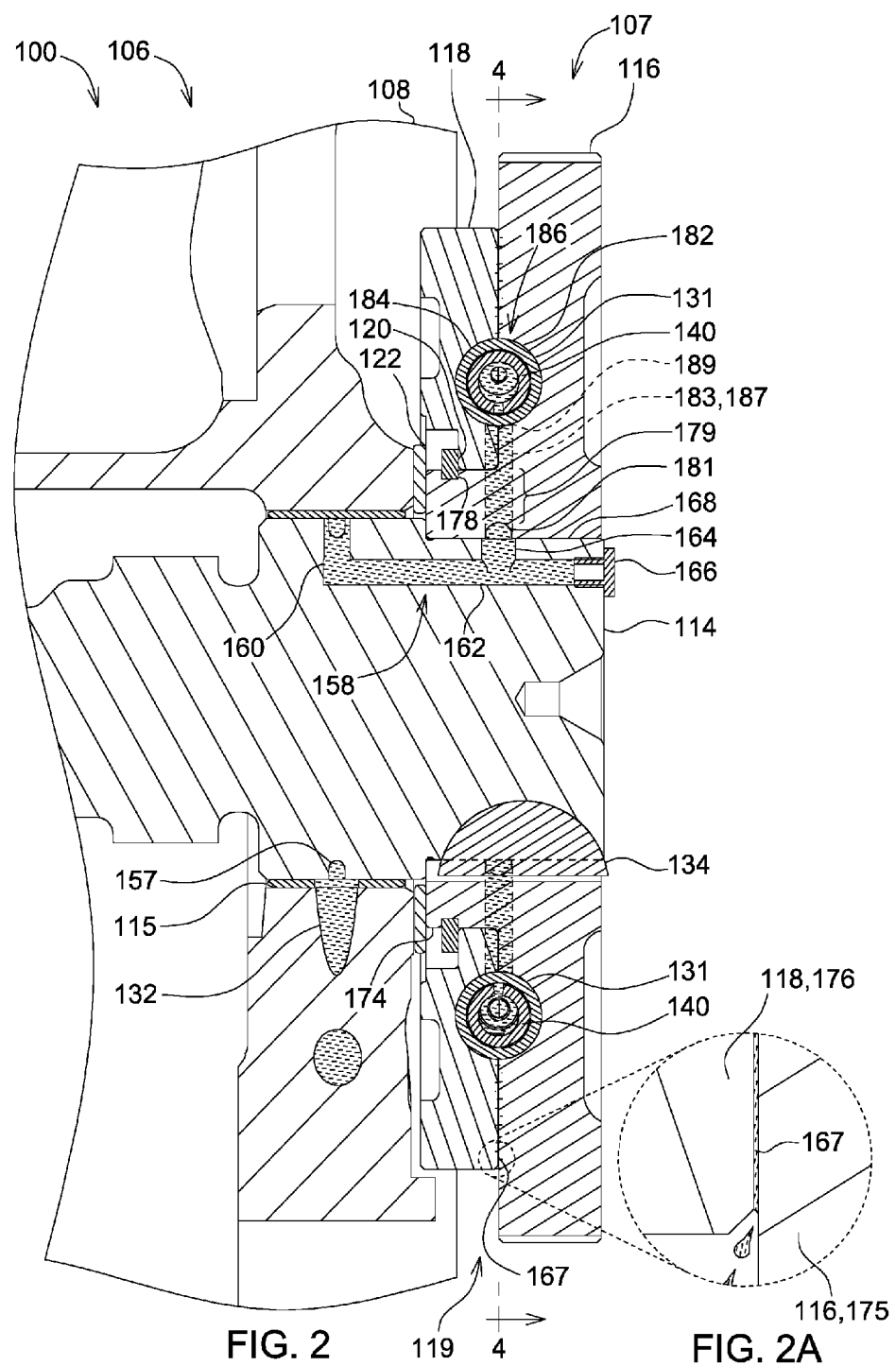
FIG. 2 is a sectional view taken along lines 2-2 of FIG. 1, showing a portion of the power system and the coupler.
FIG. 2A is an enlarged view of FIG. 2, illustrating a portion of an outer annular passage.
Figure 3:
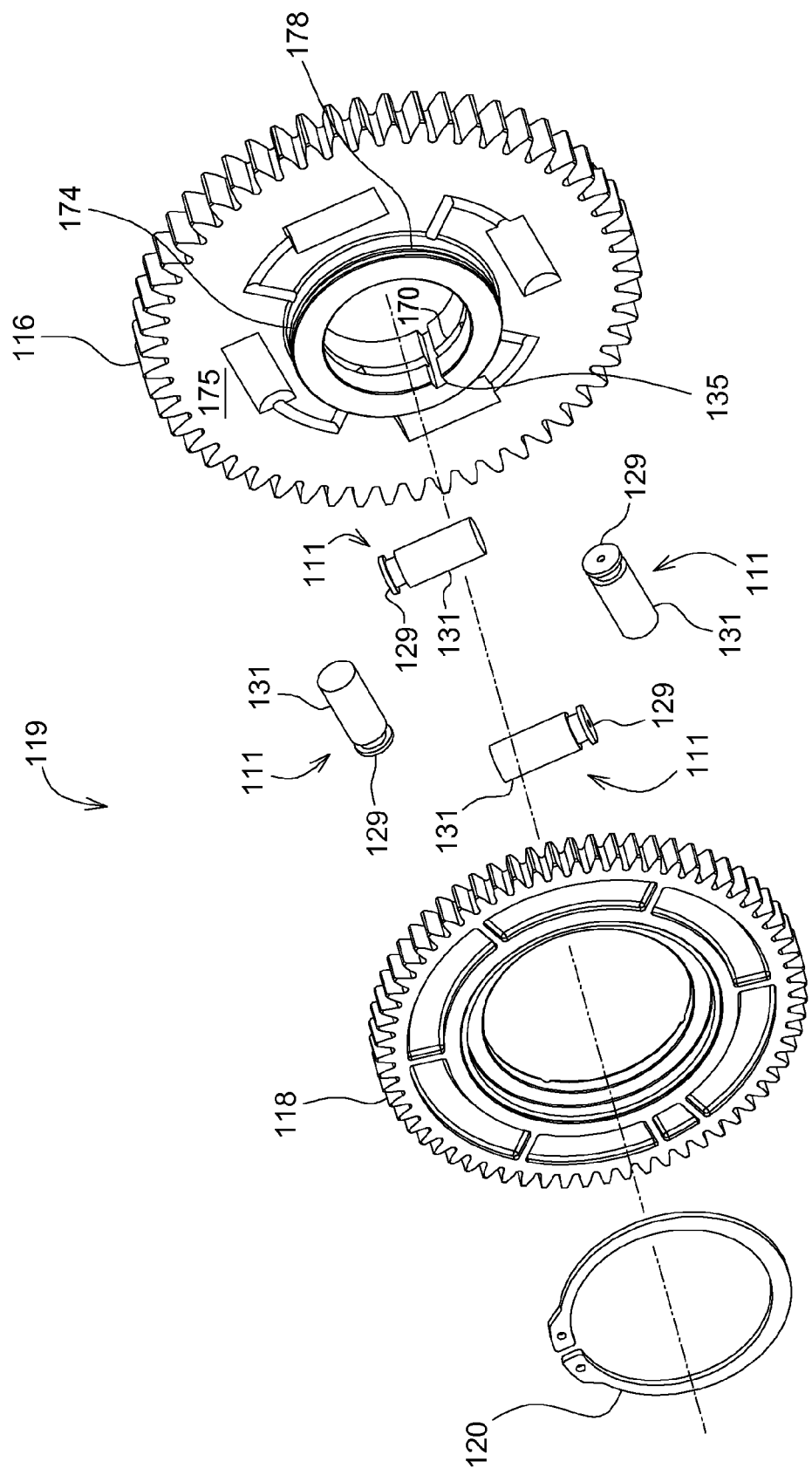
FIG. 3 is an exploded perspective view of the coupler, illustrating a first rotational element and a second rotational element aligned axially therewith.
Figure 4:
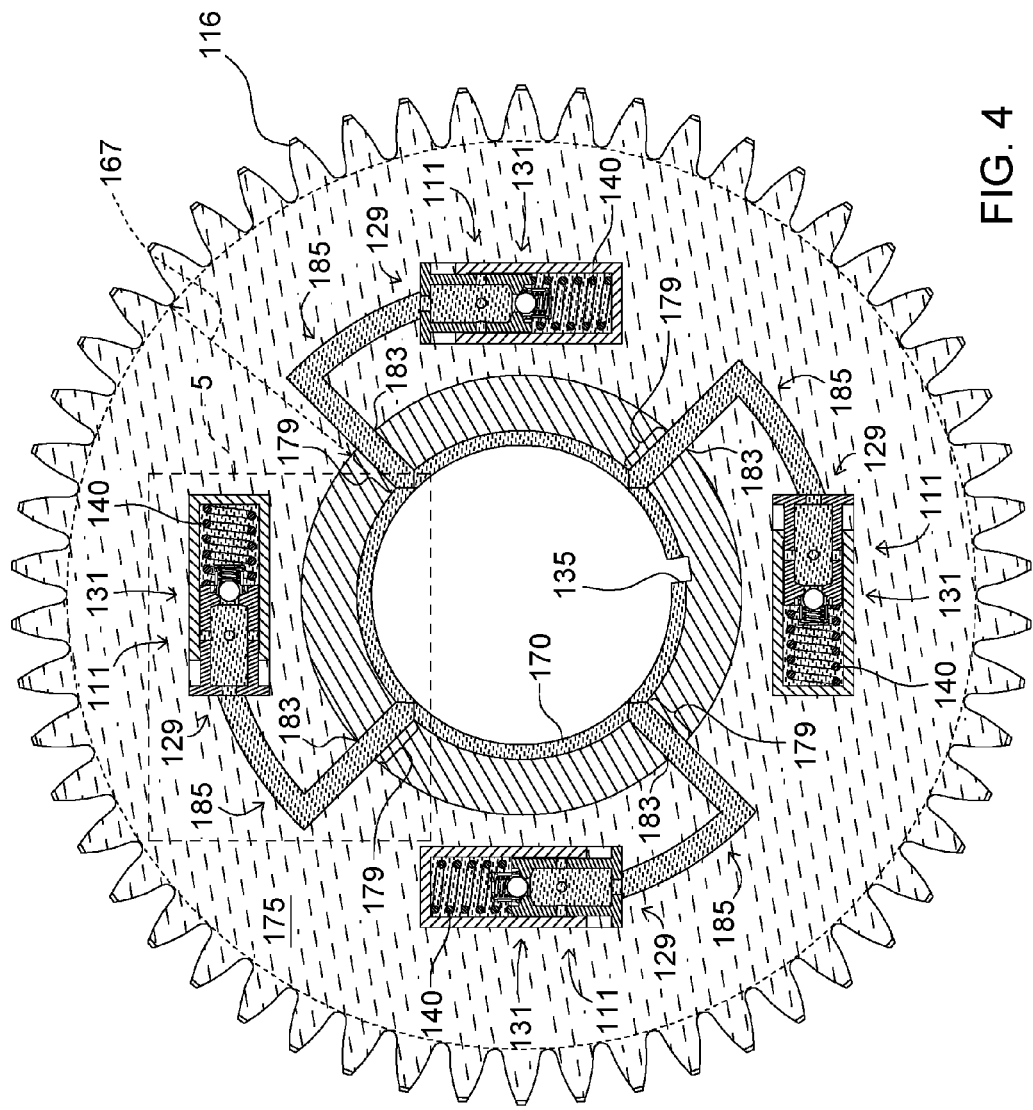
FIG. 4 is an elevational view taken along lines 4-4 of FIG. 2 of the first rotational element, illustrating a plurality of dampeners.
Figure 5:
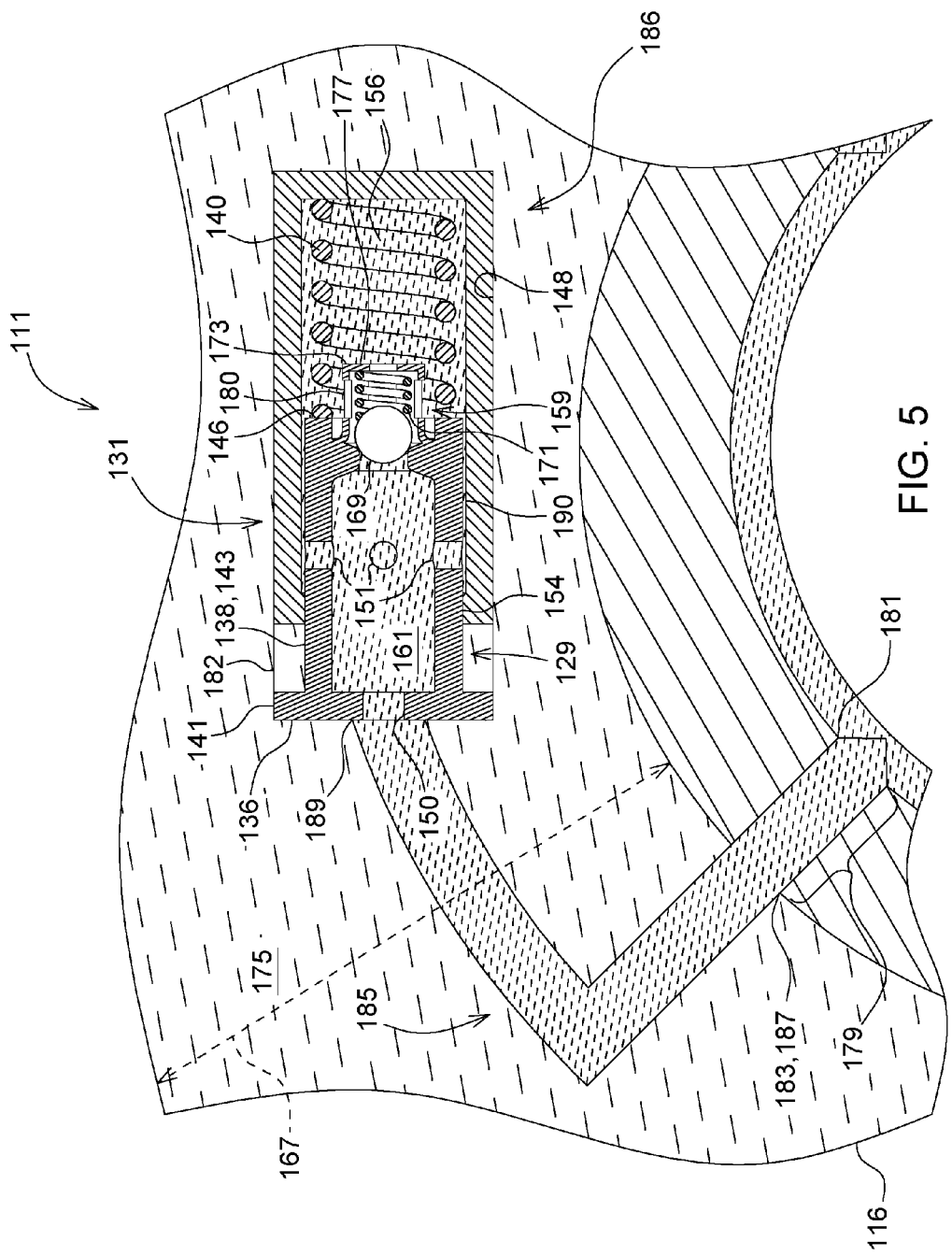
FIG. 5 is an enlarged elevational view of portion 5 of FIG. 4, illustrating one of the plurality of the dampeners.
Figure 6:
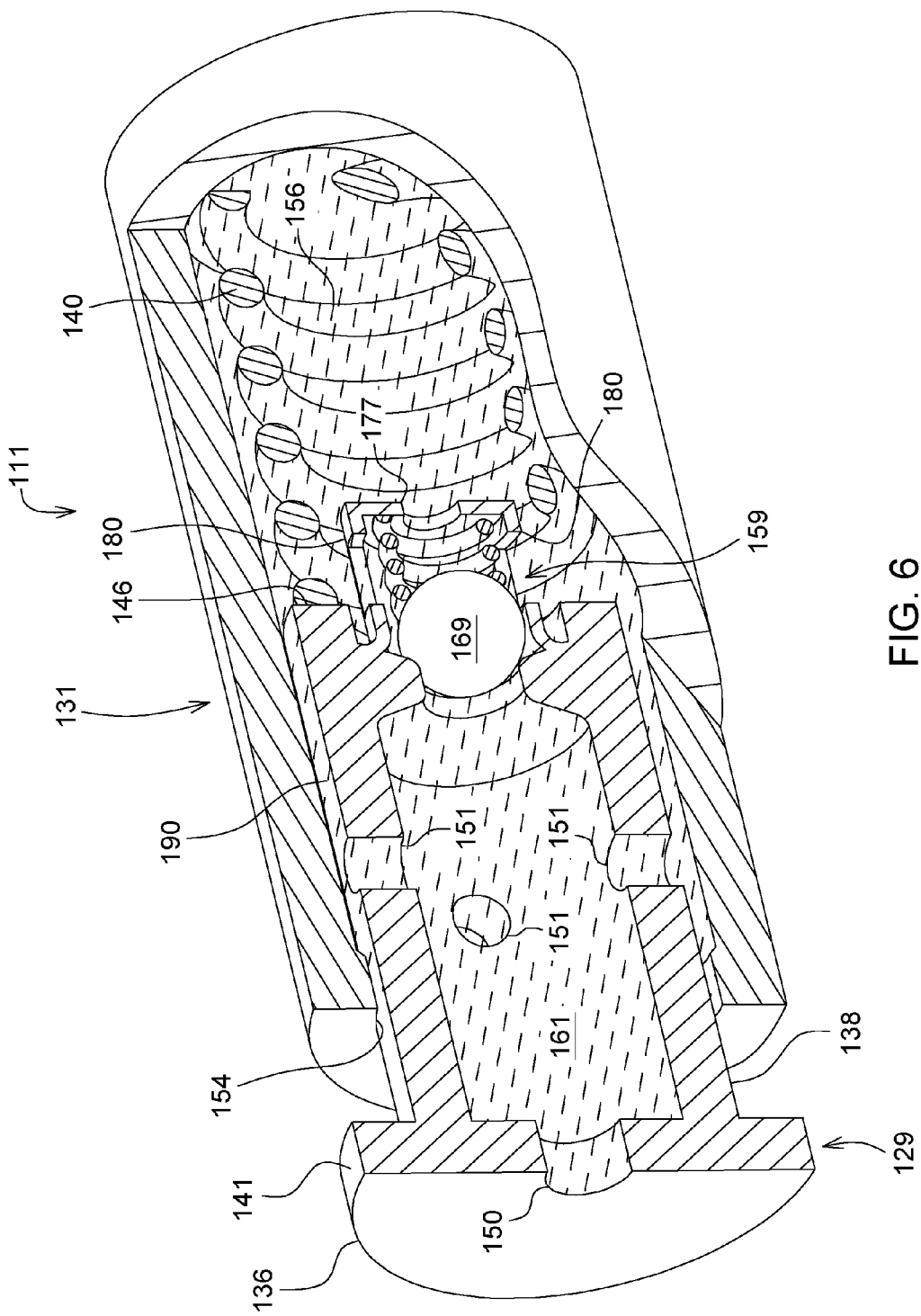
FIG. 6 is an enlarged perspective view of one of the plurality of dampeners, a portion of which is shown in cross section.
Figure 7:
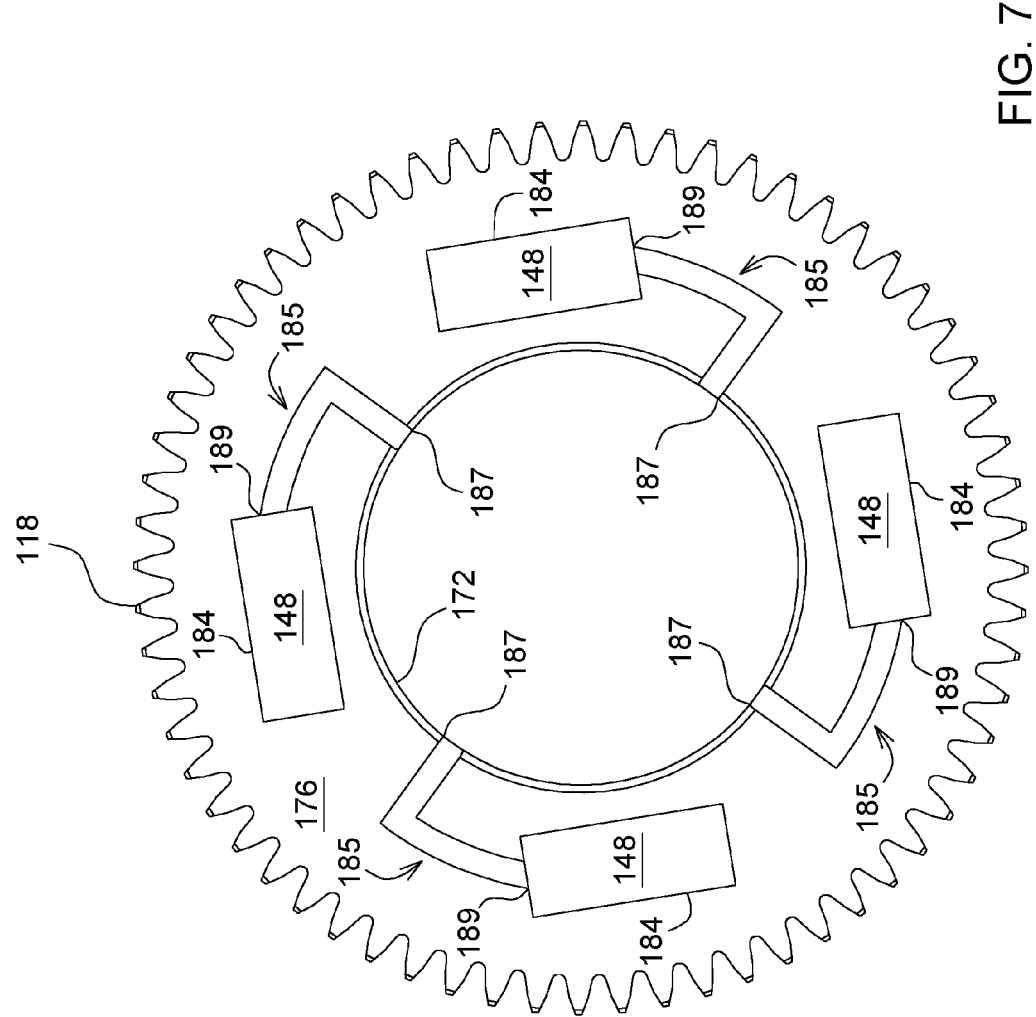
FIG. 7 is an elevational view of the second rotational element.

Referring to FIGS. 1-2, there is shown a schematic illustration of a power system 100 for providing power to a variety of machines, such as on-highway trucks, construction vehicles, marine vessels, stationary generators, automobiles, agricultural vehicles, and recreational vehicles. The engine 106 may be an internal combustion engine, such as a gasoline engine, a diesel engine, a gaseous fuel burning engine (e.g., natural gas), or any other exhaust gas producing engine.

The power system 100 comprises a coupler 119, and in the embodiment shown, the coupler 119 is mounted about a camshaft 114 and fixed for rotation therewith via a key 134 positioned in a key slot 135. The camshaft 114 may, for example, operate the valves through the mechanical linkage of pushrods and rocker arms.

A timing gear cover 117 may be coupled to an end of the block 108, so as to surround the coupler 119 and keep it and the other components thereby clean and lubricated. In some embodiments, the timing gear cover 117 may be two or more pieces. The timing gear cover 117 and the block 108 may sandwich a gasket 121.

The coupler 119 includes a first rotational element 116 and a second rotational element 118 coupled to an in axial alignment with the first rotational element 116. As illustrated, the first rotational element 116 may include a hub 174, in which the second rotational element 118 is mounted about and rotatably coupled thereto. In the illustrated embodiment, the second rotational element 118 is fully supported by the hub 174 and does not include its own bearing support (so as to reduce costs and complexity). Other embodiments, however, may include a bearing support between the first and second rotational elements 116, 118.

The first and second rotational elements 116, 118 may be axially retained relative to one another via a snap ring 120 positioned in a snap ring groove 178. Further, an annular ring 122 may be sandwiched between a block 108 of the engine 106 and the snap ring 120. The block 108 is the main support for the other parts of the engine 106 and may be cast with end walls and center webs to support a crankshaft and the camshaft 114, and the block 108 may have enlargements in its walls for lubricant and coolant passages.

The first rotational element 116 may be in mesh with and driven by a crankshaft gear 112. In contrast, the second rotational element 118 may be in mesh with a fuel pump gear 126, which is used for driving a shaft 124 of a fuel pump 128. In other applications, only one (or neither) of the rotational elements 116, 118 are gears. The fuel pump 128 may be a piston type high pressure pump and may provide fuel rail pressure of 250 MPa or more. Such pressures may impose a high cyclic torques on the engine drivetrain 107. The cyclic torque may be a result of a high torque value in one direction followed by a high torque in the opposite direction, even though the overall average torque is relatively low. This cyclic torque may be the result of the pistons injecting fluid into the cylinders of the engine 106. One potential technical effect of the coupler 119 is that it may dampen the high cycle torques, which may lower the noise levels and may prevent early failures of the engine drivetrain 107.

The camshaft 114 may include a camshaft supply passage 158. The camshaft 114 may include an annular camshaft groove 157 positioned fluidly between the block supply passage 132 and the camshaft supply passage 158. Lubricant flowing through the block 108 may be supplied to the camshaft bearing 115 and flow into the camshaft supply passage 158 once per revolution of the camshaft 114, for instance when the camshaft supply passage 158 is in partial or full alignment with a block supply passage 132.

The camshaft supply passage 158 may include a radial inlet passage 160, an offset axial passage 162, and a radial outlet passage 164. The offset axial passage 162 is positioned downstream of the radial inlet passage 160, and the radial outlet passage 164 is positioned downstream of the offset axial passage 162. An end of the offset axial passage 162 may be plugged with camshaft end plug 166. The camshaft end plug 166 may include a small aperture for providing fluid for lubricating the engine drivetrain 107.

Referring to FIGS. 2-7, the coupler 119 translates a rotational force and comprises a first rotational element 116 and a second rotational element 118. The first rotational element 116 defines a first pocket 182, and the second rotational element 118—which is in rotational alignment therewith—defines a second pocket 184 facing the first pocket 182, both of which may be machined into place with a milling machine or cutter. The first and second pockets 182, 184 define a dampening chamber 186 therebetween that varies in volume based on the overlap thereof. A fluid is positioned in the dampening chamber 186. A portion of the fluid is dispelled therefrom when the first rotational element 116 rotates relative to the second rotational element 118, causing a decrease in the volume of the dampening chamber 186.

The camshaft 114 may include a camshaft supply passage 158. The first rotational element 116 may include a first supply passage 179 positioned downstream of the camshaft supply passage 158, but upstream of the dampening chamber 186. An inlet 181 of the first supply passage 179 may be positioned at an inner circumferential surface 170 of the first rotational element 116, and an outlet 183 of the first supply passage 179 may be positioned at an outer circumferential surface 168 of the hub 174 of the first rotational element 116.

The first rotational element 116 and the second rotational element 118 may cooperate, so as to define a second supply passage 185 positioned fluidly downstream of the first supply passage 179. An inlet 187 of the second supply passage 185 may be positioned at an inner circumferential surface 172 of the second rotational element 118, and an outlet 189 of the second supply passage 185 may open into an axial aperture 150. The second supply passage 185 is shown as having an L-shape, but could take various shapes and paths between the inlet 187 and the outlet 189.

When the fluid dispels from the dampening chamber 186, it flows through a radially outer annular passage 167 positioned between an inner side 175 of the first rotational element 116 and an inner side 176 of the second rotational element 118.

The coupler 119 may include a dampener 111 positioned in the dampening chamber 186, which may include a plunger receiver 131, a plunger 129 (positioned at least partially therein), and an elastic member 140. In the illustrated embodiment, the dampener 111 is shown as being straight (about a single axis), but in other embodiments, the dampener 111 (and the components thereof) may be arced about an axis of the first and second rotational elements 116, 118. Further, in the illustrated embodiment, the first supply passage 179, the second supply passage 185, and the dampener 111 are shown in four locations spaced equidistantly about the axis of the first and second rotational elements 116, 118. The number and spacing of these components may vary, depending on coupler 119 and its application.

As shown, the elastic member 140 may be positioned in the dampening chamber 186, so as to urge the pockets 182, 184 into rotational alignment with one another. But as the elastic member 140 is compressed a portion of the fluid is dispelled from the dampening chamber 186. The elastic member 140 and the dispelling of the fluid may absorb the fluctuating torque caused by the fuel pump 128 and dampen the torsional vibrations in the engine drivetrain 107.

When the dampener 111 is in a fully extended position, the first pocket 182 may mirror and align with the second pocket 184. And when the dampener 111 is not in the fully extended position, the first pocket 182 may be offset from the second pocket 184.

The plunger 129 may include a plunger cap 136 and a plunger cylinder 138 extending therefrom. An outer circumferential surface 141 of the plunger cap 136 may have a larger diameter than an outer circumferential surface 143 of the plunger cylinder 138. The outer circumferential surface 141 of the plunger cap 136 may contact and reciprocate on an inner circumferential surface 148 of the dampening chamber 186. The plunger receiver 131 may include a radially inward mating surface 154 that contacts the plunger cylinder 138, and the plunger 129 may reciprocate on the radially inward mating surface 154. The plunger cap 136 may include the axial aperture 150 that opens into the plunger cylinder 138, which may include a radial aperture 151 positioned fluidly between the axial aperture 150 and the dampening chamber 186. As illustrated, the radial aperture 151 may be one of a plurality of radial apertures 151. The plunger cap 136 and the plunger cylinder 138 may define a reversing flow chamber 161 positioned fluidly between the axial aperture 150 and the radial aperture 151.

The plunger 129 may include a rapid flow base 146 on an opposite end of the plunger 129 relative to an end having the plunger cap 136. The plunger receiver 131 and the rapid flow base 146 define a plunging chamber 156 therebetween that varies in volume as the first rotational element 116 rotates relative to the second rotational element 118.

An outer surface of the plunger 129 and an inner surface of the plunger receiver 131 may define an annular flow passage 190 positioned therebetween. The axial aperture 150 may be positioned fluidly between the second supply passage 185 and the reversing flow chamber 161. The reversing flow chamber 161 may be positioned fluidly between the axial aperture 150 and the radial aperture 151. The radial aperture 151 may be positioned fluidly between the reversing flow chamber 161 and the annular flow passage 190. The annular flow passage 190 may be positioned fluidly between the radial aperture 151 and the plunging chamber 156.

The rapid flow base 146 may include a rapid flow check valve 159 positioned fluidly between the reversing flow chamber 161 and the plunging chamber 156. The rapid flow check valve 159 opens, in a first mode, so as to allow the fluid to flow from the reversing flow chamber 161 and quickly to the plunging chamber 156, but does not open so as to allow the fluid to flow from the plunging chamber 156 to the reversing flow chamber 161. Additionally, in the first mode, the fluid may enter the plunging chamber 156 by flowing through the axial aperture 150, the reversing chamber, the radial aperture 151, and then the annular flow passage 190.

The rapid flow check valve 159 may include a flow controller 169, an elastic valve member 171, and a valve cage 173. The elastic valve member 171 may be sandwiched between the flow controller 169 and the valve cage 173. Further, the valve cage 173 may include an axial valve aperture 177 and a radial valve aperture 180. The radial valve aperture 180 may be one of a plurality of radial valve apertures 180. The valve cage 173 may be welded to the plunger cylinder 138 and is positioned fluidly between the reversing flow chamber 161 and the plunging chamber 156.

The fluid may dispel from the plunging chamber 156 in a second mode by flowing through the annular flow passage 190, the radial aperture 151, the reversing chamber, and the axial aperture 150. This may occur when the first pocket 182 rotates relative to the second pocket 184, so as to decrease the volume of the dampening chamber 186 and the plunging chamber 156. Then, the fluid is dispelled from the axial aperture 150 through a radially outer annular passage 167, formed by an inner side 175 of the first rotational element 116 and an inner side 176 of the second rotational element 118. The fluid then may sling out onto other components of the engine drivetrain 107 and then recirculate back to the coupler 119 and other components of the engine 106.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A coupler for translating a rotational force, comprising:
   a first rotational element defining a first pocket;
   a second rotational element in axial alignment with the first rotational element and defining a second pocket facing the first pocket, the first pocket and the second pocket define a dampening chamber therebetween that varies in volume based on an overlap thereof;
   a fluid positioned in the dampening chamber, a portion of the fluid being dispelled from the dampening chamber when the first rotational element rotates relative to the second rotational element and decreases the volume of the dampening chamber; and
   a dampener positioned in the dampening chamber, the dampener comprising:
      a plunger receiver;
      a plunger positioned at least partially therein, the plunger comprising a plunger cap and a plunger cylinder extending therefrom, the plunger cap comprising an axial aperture that opens into the plunger cylinder, the plunger cylinder comprising a radial aperture positioned fluidly between the axial aperture and the dampening chamber, the plunger cap and the plunger cylinder defining a reversing flow chamber positioned fluidly between the axial aperture and the radial aperture, the plunger further comprising a rapid flow base on an opposite end of the plunger relative to an end having the plunger cap, the plunger receiver and the rapid flow base define a plunging chamber therebetween that varies in volume as the first rotational element rotates relative to the second rotational element; and
      an elastic member, the plunger receiver being positioned in contact with an end of the elastic member, the portion of the fluid being dispelled when the elastic member is compressed, and wherein:
   the first rotational element comprises a first supply passage positioned fluidly upstream of the dampening chamber, an inlet of the first supply passage is positioned at an inner circumferential surface of the first rotational element, and an outlet of the first supply passage is positioned at an outer circumferential surface of a hub of the first rotational element; and
   the first rotational element and the second rotational element define a second supply passage positioned fluidly downstream of the first supply passage, an inlet of the second supply passage is positioned at an inner circumferential surface of the second rotational element, and an outlet of the second supply passage opens into the axial aperture.

2. The coupler of claim 1, wherein the fluid dispels from the dampening chamber through an outer annular passage formed by an inner side of the first rotational element and an inner side of the second rotational element.

3. An engine drivetrain, further comprising the coupler of claim 1, the engine drivetrain comprising a camshaft, the coupler mounted about the camshaft and fixed for rotation therewith, the first rotational element being in mesh with a crankshaft gear, and the second rotational element being in mesh with a fuel pump gear.

4. The engine drivetrain of claim 3, wherein:
   the camshaft comprises a camshaft supply passage; and
   the first supply passage is positioned downstream of the camshaft supply passage.

5. The coupler of claim 1, wherein the first pocket mirrors and aligns with the second pocket when the dampener is in a fully extended position, and the first pocket is offset from the second pocket when the dampener is not in the fully extended position.

6. The coupler of claim 1, wherein an outer circumferential surface of the plunger cap has a larger diameter than an outer circumferential surface of the plunger cylinder, the outer circumferential surface of the plunger cap contacts and reciprocates on an inner circumferential surface of the dampening chamber.

7. The coupler of claim 6, wherein the plunger receiver comprises a radially inward mating surface that contacts the plunger cylinder, and the plunger reciprocates on the radially inward mating surface.

8. The coupler of claim 1, wherein an outer surface of the plunger and an inner surface of the plunger receiver define an annular flow passage positioned therebetween, the annular flow passage is positioned fluidly between the radial aperture and the plunging chamber, the fluid enters the plunging chamber in a first mode by flowing through the annular flow passage, and the fluid dispels from the plunging chamber in a second mode by flowing through the annular flow passage when the first pocket rotates relative to the second pocket and decreases the volume of the dampening chamber and the plunging chamber.

9. The coupler of claim 8, wherein the axial aperture is positioned fluidly between the second supply passage and the reversing flow chamber, the fluid enters the plunging chamber in the first mode by flowing through the axial aperture, and the fluid dispels from the plunging chamber in the second mode by flowing through the axial aperture when the first pocket rotates relative to the second pocket and decreases the volume of the dampening chamber and the plunging chamber.

10. The coupler of claim 9, wherein the radial aperture is positioned fluidly between the reversing flow chamber and the annular flow passage, the fluid enters the plunging chamber in the first mode by flowing through the radial aperture, and the fluid dispels from the plunging chamber in the second mode by flowing through the radial aperture when the first pocket rotates relative to the second pocket and decreases the volume of the dampening chamber and the plunging chamber.

11. The coupler of claim 9, wherein the rapid flow base comprises a rapid flow check valve positioned fluidly between the reversing flow chamber and the plunging chamber, the rapid flow check valve opens so as to allow the fluid to flow from the reversing flow chamber to the plunging chamber, but does not open so as to allow the fluid to flow from the plunging chamber to the reversing flow chamber.

12. The coupler of claim 11, wherein the rapid flow check valve comprise:
  a flow controller;
  an elastic valve member; and
  a valve cage, the elastic valve member is sandwiched between the flow controller and the valve cage, the valve cage is surrounded by the elastic member and positioned in the dampening chamber, the valve cage comprises an axial valve aperture and a radial valve aperture.

13. The coupler of claim 12, wherein the valve cage is welded to the plunger cylinder and is position fluidly between the reversing flow chamber and the plunging chamber.

14. A coupler for translating a rotational force, comprising:
  a first rotational element defining a first pocket;
  a second rotational element in axial alignment with the first rotational element and defining a second pocket facing the first pocket, the first pocket and the second pocket define a dampening chamber therebetween that varies in volume based on an overlap thereof;
  a fluid positioned in the dampening chamber, a portion of the fluid being dispelled from the dampening chamber when the first rotational element rotates relative to the second rotational element and decreases the volume of the dampening chamber; and
  a dampener positioned in the dampening chamber, the dampener comprising:
    a plunger receiver;
    a plunger positioned at least partially therein, the plunger comprising a plunger cap and a plunger cylinder extending therefrom, the plunger cap comprising an axial aperture that opens into the plunger cylinder, the plunger cylinder comprising a radial aperture positioned fluidly between the axial aperture and the dampening chamber, the plunger cap and the plunger cylinder defining a reversing flow chamber positioned fluidly between the axial aperture and the radial aperture, the plunger further comprising a rapid flow base on an opposite end of the plunger relative to an end having the plunger cap, the plunger receiver and the rapid flow base define a plunging chamber therebetween that varies in volume as the first rotational element rotates relative to the second rotational element; and
    an elastic member, the plunger receiver being positioned in contact with an end of the elastic member, the portion of the fluid being dispelled when the elastic member is compressed.

* * * * *